United States Patent
Rosendahl et al.

(10) Patent No.: US 11,106,784 B2
(45) Date of Patent: Aug. 31, 2021

(54) VERTICALLY INTEGRATED AUTOMATIC THREAT LEVEL DETERMINATION FOR CONTAINERS AND HOSTS IN A CONTAINERIZATION ENVIRONMENT

(71) Applicant: NeuVector, Inc., Milpitas, CA (US)

(72) Inventors: Henrik Rosendahl, Milpitas, CA (US); Fei Huang, Fremont, CA (US); Gang Duan, San Jose, CA (US)

(73) Assignee: NeuVector, Inc., San Jose, CA (US)

(*) Notice: Subject to any disclaimer, the term of this patent is extended or adjusted under 35 U.S.C. 154(b) by 423 days.

(21) Appl. No.: 16/155,742

(22) Filed: Oct. 9, 2018

(65) Prior Publication Data
US 2020/0110873 A1    Apr. 9, 2020

(51) Int. Cl.
*G06F 21/53*    (2013.01)
*G06F 21/57*    (2013.01)

(52) U.S. Cl.
CPC ............ *G06F 21/53* (2013.01); *G06F 21/577* (2013.01); *G06F 2221/034* (2013.01)

(58) Field of Classification Search
CPC .. G06F 21/53; G06F 21/577; G06F 2221/034; G06F 21/51; G06F 21/563; G06F 8/61; G06F 11/3616
See application file for complete search history.

(56) References Cited

U.S. PATENT DOCUMENTS

2018/0336351 A1* 11/2018 Jeffries .................. G06F 21/53
2020/0097662 A1* 3/2020 Hufsmith ................ H04L 67/10

* cited by examiner

*Primary Examiner* — Paul E Callahan
(74) *Attorney, Agent, or Firm* — Fenwick & West LLP

(57) ABSTRACT

A threat level analyzer probes for one or more threats within an application container in a container system. Each threat is a vulnerability or a non-conformance with a benchmark setting. The threat level analyzer further probes for one or more threats within a host of the container service. The threat level analyzer generates a threat level assessment score based on results from the probing of the one or more threats of the application container and the one or more threats of the host, and generates a report for presentation in a user interface including the threat level assessment score and a list of threats discovered from the probe of the application container and the host. A report is transmitted by the threat level analyzer to a client device of a user for presentation in the user interface.

18 Claims, 7 Drawing Sheets

200

Container List 202

| Name↓ᴬ | OS | Node | Image | Status | Score | High | Med | Time |
|---|---|---|---|---|---|---|---|---|
| ecs-deploy-docs-2-docs-94e5f... | debian:8 | ip-172-31-43-216 | neuvector/docs | Finished | 4.7 | 129 | 210 | Mar 05, 2018 09:06:17 |
| ecs-wordpress-demo-4-mysql... | debian:8 | ip-172-31-41-138 | mysql | Finished | 4.3 | 7 | 12 | Mar 05, 2018 09:06:20 |
| ecs-wordpress-demo-4-wordpr... | debian:9 | ip-172-31-41-138 | wordpress | Finished | 0 | 10 | 40 | Mar 05, 2018 09:06:20 |
| nginx | debian:8 | ip-172-31-41-138 | nvbeta/nginx | Finished | 5 | 61 | 189 | Mar 05, 2018 09:06:20 |
| node1 | ubuntu:14.04 | ip-172-31-43-216 | nvbeta/node | Finished | 5 | 19 | 234 | Mar 05, 2018 09:06:24 |
| node2 | ubuntu:14.04 | ip-172-31-43-216 | nvbeta/node | Finished | 7.2 | 19 | 234 | Mar 05, 2018 09:06:22 |
| node3 | ubuntu:14.04 | ip-172-31-43-216 | nvbeta/node | Finished | 6.2 | 19 | 234 | Mar 05, 2018 09:06:19 |
| redis | debian:8 | ip-172-31-41-138 | redis | Finished | 7.2 | 18 | 43 | Mar 05, 2018 09:06:24 |

Scanned: ● Failed: ● Scanning: ● Scheduled: ● Vulnerability database version: 1.039

Legend 228

Detected Threats List 216

| Name | Urgency↓ᴬ | Score | Package | Version | Fixed Version |
|---|---|---|---|---|---|
| CVE-2017-5754 | High | 4.7 | linux | 3.13.0-112.159 | 3.13.0-139.188 |
| CVE-2016-1252 | High | 4.3 | apt | 1.01ubuntu2.14 | 1.01ubuntu2.17 |
| CVE-2018-1000001 | High | 0 | eglibc | 2.19-0ubuntu6.9 | 2.19-0ubuntu6.14 |
| CVE-2016-6313 | High | 5 | gnupg | 1.4.16-1ubuntu2.3 | 1.4.16-1ubuntu2.4 |
| CVE-2017-1000379 | High | 5 | libgcrypt11 | 1.5.3-2ubuntu4.3 | 1.5.3-2ubuntu4.4 |
| CVE-2017-1000364 | High | 7.2 | linux | 3.13.0-112.159 | 3.13.0-121.170 |
| CVE-2017-7184 | High | 6.2 | linux | 3.13.0-112.159 | 3.13.0-121.170 |
| CVE-2017-1000111 | High | 7.2 | linux | 3.13.0-112.159 | 3.13.0-115.162 |
|  | High | 7.2 | linux | 3.13.0-112.159 | 3.13.0-128.177 |

FIG. 2A

Nodes

| Name | OS | Platform | CPUs | Memory |
|---|---|---|---|---|
| ip-172-31-41-138 | Amazon Linux AMI 2017.03 | Amazon-ECS | 1 | 993.5 MB |
| ip-172-31-43-216 | Amazon Linux AMI 2017.03 | Amazon-ECS | 1 | 993.5 MB |
| ip-172-31-44-255 | Amazon Linux AMI 2016.03 | Amazon-ECS | 1 | 993.5 MB |

Node List 232 / OS 234 / Platform 238 / Hardware Info 240 / 230

DOCKET BENCHMARK

| Test number | Level | Message |
|---|---|---|
| ⊟ 1(14) | | Host Configuration |
| 1.1 | WARN | Ensure a separate partition for containers has been created |
| 1.2 | NOTE | Ensure the container host has been Hardened |
| ⊟ 1.3(2) | INFO | Ensure Docker is up to date |
| | INFO | Using 17.03.1 verify is it up to date as deemed necessary |
| | INFO | Your operating system vendor may provide support and ... |
| ⊟ 1.4(1) | INFO | Ensure only trusted users are allowed to control Docker ... docker x:497:ec2-user |
| 1.5 | WARN | Ensure auditing is configured for the Docker daemon |
| 1.6 | WARN | Ensure auditing configured for files and dir. -/var/lib/docker |
| 1.7 | WARN | Ensure auditing configured for files and dir. -/etc/docker |
| ⊟ 1.8(1) | INFO | Ensure auditing configured for files and dir. - docker.service |
| | INFO | File not found |
| ⊟ 1.9(1) | INFO | Ensure auditing configured for files and dir. - docker.socket |
| | INFO | File not found |
| ⊟ 1.10(1) | INFO | Ensure auditing configured for files and dir. - /ect/default/doc |
| | INFO | File not found |
| ⊟ 1.11(1) | INFO | Ensure auditing configured for files and dir. - /ect/docker/dae |

Threat Report 242 / Threat Severity Level 244 / Threat Description 246

FIG. 2B

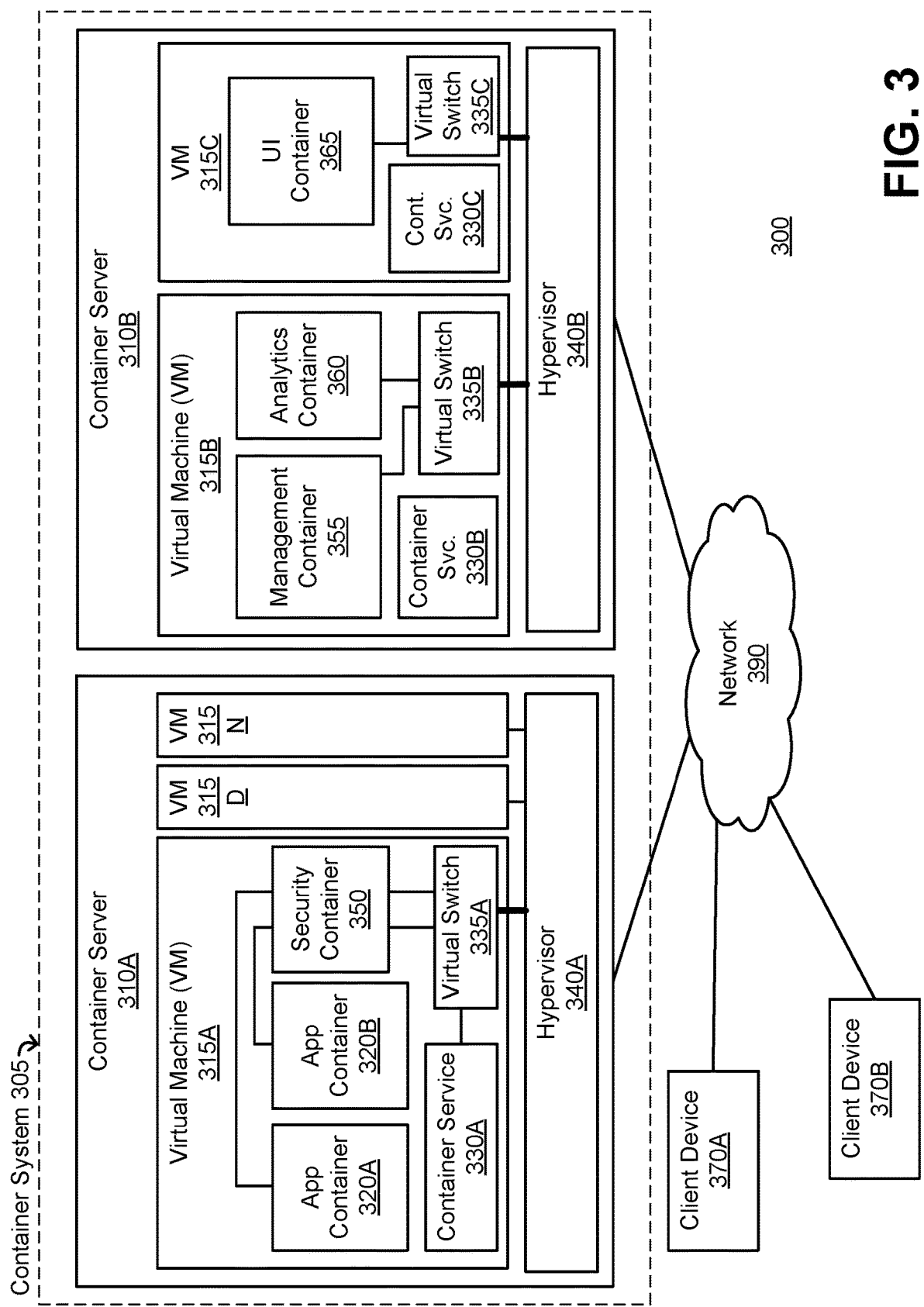

VERTICALLY INTEGRATED AUTOMATIC THREAT LEVEL DETERMINATION FOR CONTAINERS AND HOSTS IN A CONTAINERIZATION ENVIRONMENT

FIELD OF ART

The disclosure generally relates to the field of containerization security, and specifically to automated threat level determination for containers running on containerization platforms as well as their hosts.

BACKGROUND

A recent development in networked infrastructure is the container model. In the container model, a kernel of an operating system (e.g., Linux) allows for multiple isolated user-space instances, or "containers," executing simultaneously. Each container is isolated from other containers, and may access a set of resources that are isolated from other containers. Each container also interacts with a container service, which may provide various functions, such as an application programming interface (API) to allow each container to access various functions of the container service (e.g., establishing communications, communicating with other containers, logging). One advantage of such a container system is the ability of the container system, with the assistance of the container service, to quickly and transparently migrate containers between hosts during live operation, e.g., for load balancing. Another advantage is that, since virtual emulation of resources, such as in a virtual machine (VM) environment, is not being performed to provide resources to the containers, the overhead compared to a VM-based environment is much lower.

However, within such container systems, security and threat detection can be a more challenging issue. A container system includes many different components, in many cases more than a traditional system. The container system has a host operating system, a container service, multiple application containers with their own configuration, with each application container accessing various resources, such as with network connections other containers and to the Internet. Such a complex system has a broad surface area for malicious attackers to penetrate. While traditional systems may have multiple operators for detecting and resolving security issues (e.g., developers for applications, operations staff for hosts, and network security staff for network access operations), having these multiple operators operate on a container system is cumbersome, reduces efficiency, and can easily cause shortfalls due to the complex division of responsibilities. Therefore, what was lacking, inter alia, was a vertically integrated system to automatically determine, report, and respond to threats and security issues in all aspects of a container system.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

FIG. 2A is an exemplary user interface presenting a list of containers and their associated threat level scores, along with a threat list for a container, as determined by the threat level analyzer, according to an example embodiment.

FIG. 2B is an exemplary user interface presenting a list of hosts and a detail interface reporting individual threat tests, as determined by the threat level analyzer, according to an example embodiment.

FIG. 3 illustrates an example container environment with an exemplary container architecture in which a threat level analyzer, such as the threat level analyzer of FIG. 1, may operate, according to an embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Embodiments herein disclose a method in a container system for determining a threat level assessment for an application container. A threat level analyzer probes for one or more threats within an application container in a container system. Each threat is a vulnerability or a non-conformance with a benchmark setting. The application container includes computer-readable instructions, and is initiated via a container service and isolated using operating system-level virtualization.

The threat level analyzer further probes for one or more threats within a host of the container service. The threat level analyzer generates a threat level assessment score based on results from the probing of the one or more threats of the application container and the one or more threats of the host, and generates a report for presentation in a user interface including the threat level assessment score and a list of threats discovered from the probe of the application container and the host. A report is transmitted by the threat level analyzer to a client device of a user for presentation in the user interface.

Example Threat Level Analyzer and Container Environment

Figure 1:
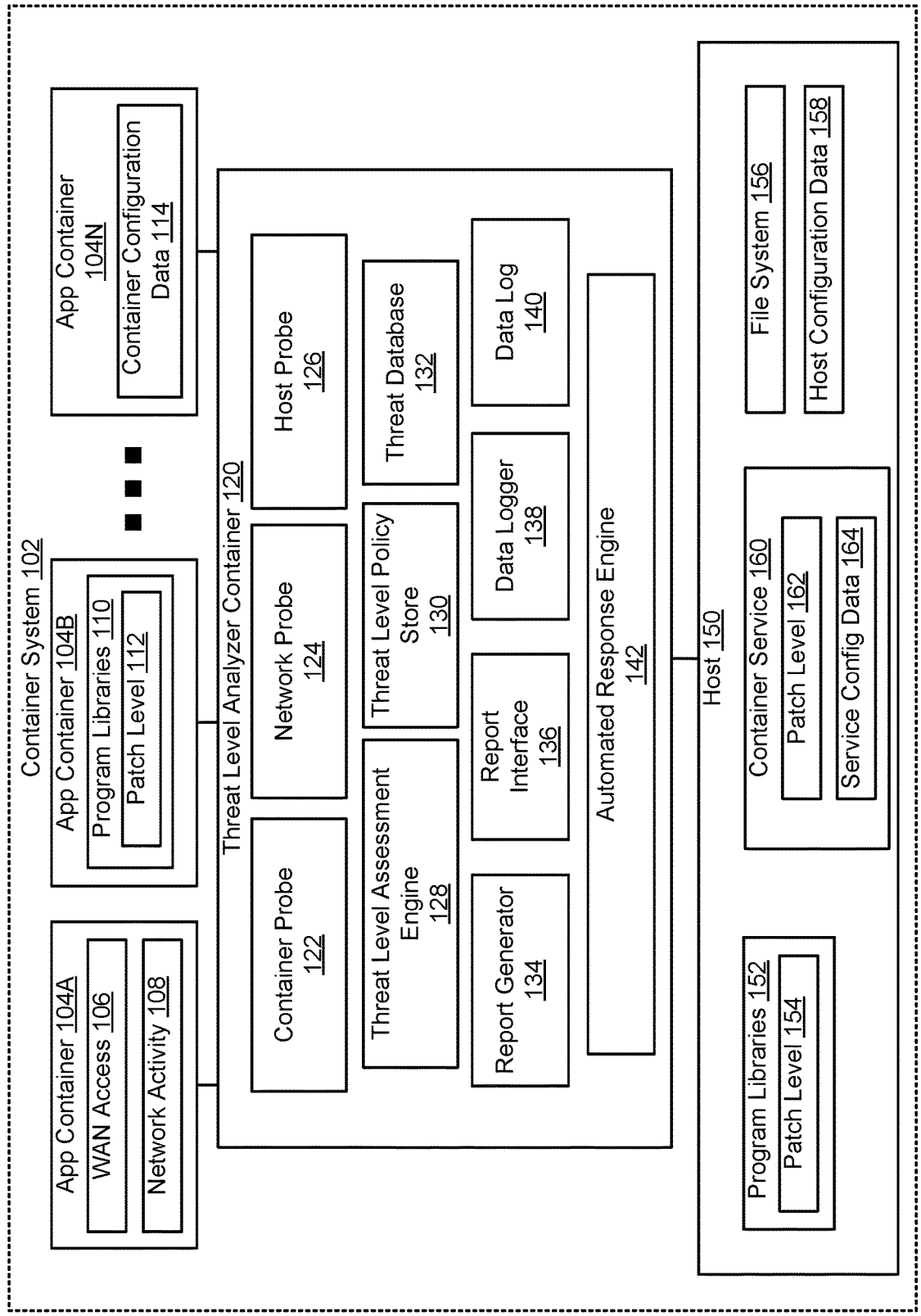
FIG. 1 illustrates an example of a container system with a threat level analyzer to determine a threat level of application containers and hosts on which the container system reside, according to an example embodiment.

FIG. 1 illustrates an example of a container system with a threat level analyzer to determine a threat level of application containers and hosts on which the container system reside, according to an example embodiment. FIG. 1 illustrates a simplified view of a container system 102. Some elements, such as separate servers, a local network, and so on, are omitted for sake of clarity. These elements are described in further detail with regards to FIG. 3. The container system 102 includes one or more application ("app") containers 104A-N (generally 104), a threat level analyzer container 120, and the host 150 and container service 160 upon which the containers execute.

Container System

The container system 102 is an operating system (OS) level virtualization environment whereby one or more "containers" execute on a shared set of resources of a host. For example, a container may be an instance of a user-space process executing on a resource isolated instance within an OS. Alternatively, the container may itself execute multiple processes, each sharing the resources of that container. Each container has access to a set of isolated resources, but does not have direct access to the actual physical resources of the underlying hardware of the host, e.g., host 150. These physical resources may include a CPU, I/O devices, network devices, memory, physical storage, and so on. The isolated resources are not emulated, as would be the case with resources within a virtual machine, but are rather presented to the app container as a portion of the physical resources, with the remainder of the physical resources hidden from the app container. A container service executing on the host 150, such as container service 160, configures the aforementioned isolated resources for each container. The container system 102 as illustrated in FIG. 1 is a simplified view of the components of a container system. Additional details of components that may be used in a container system 102, including supporting services, underlying hardware, and so on, are described with further detail below with regards to FIG. 3.

An advantage of such a container system 102 is that each container is isolated from other containers in the container system 102, increasing security. Scalability may also be improved, as containers can be easily added and removed without having to be customized for a specific physical resource layout. Other advantages may also be present in a container system 102. For example, when the same data is accessed by different containers, only the data portions that vary between the containers may have different instances. The data that is the same is not duplicated, thus saving space. The container system 102 may also use less resources than a full virtualization environment, as the OS level virtualization in the container system 102 does not necessarily require the execution of a separate guest OS with its own kernel within each container and the precise emulation of all hardware components for that guest OS to execute.

However, a challenge in such a container system 102 is an increase in complexity due to the number of components compared to traditional systems (e.g., one in which applications run without a container service and without resource isolation). This causes threat analysis of the entire container system 102 to become more complex compared to a traditional system. For example, in a traditional system the components that are combined within a container system 102 may be maintained by different administrators/operators. However, within the container system 102, such a division of labor and monitoring resources may cause various threats to be missed due to the separation of resources within an integrated system, and due to the added complexity due to the integrated system. In addition, as the container system 102 is highly automated, traditional countermeasures against security threats, such as locking down servers based on network (e.g., IP) address and network ports, are ineffective and defeat the purpose of deploying containers as they are crude and indiscriminate, e.g., by potentially locking down unaffected app containers due to threats detected in other app containers.

This issue is solved by the installation of the threat level analyzer operating as the threat level analyzer container 120 within the container system 102. As described in further detail below, the threat level analyzer container 120 is able to probe within the app containers 104, as well as the container service 160 and its host 150, determine a threat level assessment of each of these, generate reports based on the threat assessment, and perform actions in response to certain determined threats.

Application Containers

The app containers 104A-N (or app containers 104) are containers executing within the container system 102. As noted above, containers, such as the app containers 104, are isolated instances executing with OS level virtualization within an operating system. The operating system may execute with a single kernel, which provides the necessary environment to each of the app containers 104. However, each app container 104 is isolated from other containers within the container system 102, and cannot see the resources used by the other app containers 104. Therefore, each app container 104 cannot share processes with other app containers 104, and instead communicate similarly to processes running on separate OSs and/or separate machines, e.g., by network communication, etc.

Each app container 104 may perform various network activities, such as WAN (wide area network) access 106 (e.g., to the Internet) and network activity 108 (e.g., any access via a local area network). Each app container 104 may include various program libraries 110, and each of these program libraries may be at a particular patch level 112. Each app container 104 also includes container configuration data 114. Note that although these elements are illustrated in different app containers 104 in FIG. 1, the illustration is for the sake of organization and does not mean that each app container 104 is limited to these elements as shown. Instead, each app container 104 may include all of the elements described here.

The WAN access 106 may include any access to an external network that is not local to the network upon which the app container 104 resides (e.g., not on the subnet of the app container 104). This may include any WAN, the Internet, an external LAN (local area network), and so on. For example, an app container 104 may have WAN access 106 by executing a web server process, and may create open network sessions, listen on certain network ports, respond to requests from clients, and so on. WAN access 106 may indicate that the app container 104 includes a connection with which an entity in the external network may access the app container 104, either in an authorized connection, or through unauthorized and/or malicious means. Therefore, WAN access 106 for an app container 104 carries with it a potential risk of having confidential information accessed by an unauthorized entity, either maliciously or accidentally.

The network activity 108 may include, but is not limited to, transmitting and receiving network data, including network packets, using various network protocols, such as TCP/IP, UDP, VPN, and so on, by processes executing in each app container 104. Network activity 108 may include any activity by an app container 104 that uses a network switch, such as a virtual network switch provided by the container service 160 to the app container 104.

In addition to activities such as WAN access 106 and network activity 108, the app containers 104 also include various the program libraries 110 which are units of executable code that may be called to perform various functions. Examples of such program libraries 110 include data structure libraries, math libraries, graphical interface presentation libraries, image rendering libraries, network access libraries, I/O device access libraries, and so on. These libraries may be combined in to collections, such as the Apache C++ Standard Library, Java Class Library, Python standard library, Microsoft Windows™ API, Linux API, and so on. The program libraries 110 may also include self-contained application packages that perform a function, such as a database, file server, web server, virtual security gateway, and so on. These may be commercial application packages that are installed within an app container 104 to be executed.

The patch level 112 indicates a version number of each of the program libraries 110. The version number of a program library 110 indicates a state of revision of the program library 110, with each state of revision making changes upon a previous state of revision by adding features, removing features, correcting errors, removing bugs, and so on. These revisions may involve changes to the executable code of the program library 110. In particular, a patch level 112 of a program library 110 may include executable code that has exploitable vulnerabilities. Such a vulnerability occurs when there is an error in the logic of the executable code that allows an attacker to exploit the executable code by inputting data or manipulating the program library 110 in a way that is unintended by the creators of the program library 110 and which causes an undesired behavior. Such an undesired behavior may include extracting sensitive data (e.g., personally identifiable information), taking unauthorized control of an app container 104, gaining access into restricted memory areas (e.g., a memory space allocated to another app container 104) and so on.

The container configuration data 114 indicates various configuration information for each app container 104. The container configuration data 114 includes various attributes, properties, characteristics, initialization parameters, settings, and other metadata related to the app container 104. The container configuration data 114 may include, but is not limited to access privileges of the app container 104 (e.g., root access), type of application executing in the app container (e.g., web server, database, etc.), number of processes executing in the app container 104, parameters for the program libraries 110, and so on.

Note that although the app containers 104 are shown to be within a monolithic container system 102, in practice they may be spread among multiple hosts on multiple hardware devices, multiple operating system instances, and/or multiple virtual machines. These are not shown here for clarity of illustration.

Host

The host 150 is a system upon which the container system 102 executes. The host may include one or more hardware devices, virtual machines, or a combination thereof. In one embodiment, a host 150 may be an x86 computing device executing a Linux-based operating system. The computing device of the host 150 may be similar to the computing device described with reference to FIG. 5. The host 150 includes at least program libraries 152 and a file system 156 and host configuration data 158, with each of the program libraries 152 having a patch level 154. The host also includes a container service 160, which also has a patch level.

The program libraries 152 may be similar to the program libraries 110 of the app container 104. However, in some cases, the program libraries 152 for the host 150 may provide additional functions, which are specific to the host 150. These may include kernel-level operations (e.g., power management, network management, access right control, system calls, etc.), admin-level functions (e.g., user management, etc.), boot configuration, and so on. The program libraries 152 may also include the components of an operating system, such as a kernel, graphical interface, desktop environment software, utility applications, and other programs and applications that may be included with the operating system or separately executing or installed on the host 150.

Each of the program libraries 152 of the host 150 may also include a patch level 154 indicating a version or state of revision of the corresponding program library 152. As with the patch levels 112 of the program libraries 110, certain patch levels 154 may include state of revisions of the executable code of a program library 152 that have vulnerabilities and other issues that may allow exploitation by a malicious user.

The file system 156 is a set of all data stored on the host 150 and the structure of the data stored on the host 150. The data may be arranged in a traditional file system structure, such as a hierarchal file structure with folders and files (which are stored and indexed using index files, block pointers, and so on). The data may also be arranged in other methods, such as within a relational database, object database, and so on. Examples of file system architectures include FAT, NTFS, ext3, UFS. The file system 156 may include files that when read by the host 150 may cause the host 150 to execute malicious program code that exploits various vulnerabilities in the program libraries 152 of the host.

The host configuration data 158 includes configuration information for the host. This includes various parameters for the host, similar to the container configuration data 114. For example, this may include the configuration files and data within an /etc/ folder in the case of Linux, or a registry file in the case of Windows. As another example, this may include configuration and settings for programs that may execute on the host. The host configuration data 158 may include configuration information for various hardware devices, such as network devices, storage devices, and so on. The host configuration data 158 may also include firmware and other low-level device configuration information, such as microcode for processors.

The container service 160, which is described in additional detail below with regards to FIG. 3, provides various API and other services and functions to enable the containerization of the processes executing in the app containers 104. These may include functions to allow for division of resources of the host 150 among the various app containers 104, and also for isolation of each app container's view of the resources from other app containers 104. The functions of the container service 160 may also allow limiting of the resources that are available to each app container 104. The container service 160 allows for the initialization and configuration of app containers 104, within which processes may execute. Examples of container services include Docker™ and Kubernetes™.

The container service 160 may also indicate a patch level 162. The patch level 162 indicates the version number of the container service 160 software, and may also indicate version numbers and/or states of revision of sub-components of the container service 160. As with the patch level 112 of the app containers 104 and the patch level 154 of the program libraries 152, updates may be made to the container service 160 to improve its functionality and to remove issues that may cause vulnerabilities in the container service 160 software.

The container service 160 also includes service configuration data 164. This service configuration data 164 includes configuration data for the container service 160, and may be similar to the container configuration data 114 or the host configuration data 158. The service configuration data 164 may be for a daemon of the container service 160, and may configure ports on which the daemon listens on, security settings, container initialization settings, container resource settings (e.g., how to isolate and limit the resources of each container), storage driver settings, and so on.

Threat Level Analyzer

The threat level analyzer container 120 determines a threat level of each app container 104 based on information about the app container 104 as well as the host 150 upon which the app container 104 is executing. This threat level represents an overall security risk of an app container 104, based on objective scans made by the threat level analyzer container 120 of the app container 104, and may be represented by a threat level assessment score. The threat level analyzer container 120 includes a threat database 132, a container probe 122, a network probe 124, a host probe 126, a threat level policy store 130, a threat level assessment engine 128, a report generator 134, a report interface 136, a data logger 138, a data log 140, and an automated response engine 142.

The threat database 132 lists one or more potential threats that may be discovered in the container system 102. These threats may include both vulnerabilities and/or benchmark settings, and may also include network attack signatures. Vulnerabilities may lie (i.e., be found) within multiple software sources, such as the program libraries 110, components of program libraries 110, container configuration data 114, program libraries 152, service configuration data 164, file system 156, host configuration data 158, and so on. These vulnerabilities may be referred to as Common Vulnerabilities and Exposures (CVEs). In one embodiment, the threat database 132 includes a database of CVE identifiers and metadata used to identify the associated CVEs in the various software sources noted above. Each CVE is a section in executable code, property, configuration data, file, or other data that may be utilized and exploited by a malicious user to perform an undesired or unauthorized action in a computing system. The exploitation of the CVE may be in a fashion not originally intended by the creator of the software source. Typically, CVEs are identified using unique identifiers that are comprised of alphanumeric characters. Lists of CVE identifiers, along with their descriptions, may be maintained by various entities, such as software product producers, a central authority (e.g., the Mitre Corporation of the US Government), or a third party. These CVEs may be periodically entered into the threat database 132 (e.g., by a process in the threat level analyzer container 120). Each entry in the threat database 132 may include the CVE identifier, metadata regarding the CVE, as well as a computer-readable signature, i.e., a means of allowing a computer to identify the CVE within the actual software source. The metadata regarding the CVE may indicate its severity level, such as a numerical score, or a labeled score (e.g., low, medium, high, critical). The metadata may also indicate when the CVE was discovered, if an attack has been generated in the wild, based on that CVE, and so on. The signature may be a set of instructions that when executed by the computing system can return a true or false result uniquely indicating whether the CVE exists. The signature may include a hash value, which may be compared to a hash of the software source, such as a program library or other element. If a match is found, then this indicates that the CVE exists. The signature may also indicate a patch level of a program library which includes a CVE. If that patch level is matched to a patch level in a program library in the container system 102, then the CVE exists. Other means of identifying the CVE may also exist.

The threat database 132 may also include a list of benchmark (i.e., recommended) settings, such as configuration parameters, settings, system states, and other actions that should be taken in a computing system in order to comply with various security standards, to reduce a surface area of attack, mitigate fallout from an attack, to prevent an attack, and so on. The list of benchmark settings may include various sub-lists, each directed to a specific sub-component of the computing system. For the container system 102, these sub-components may include the host 150, the container service 160, the various program libraries, and so on. Each entry in the list of benchmark settings may include an identifier for that benchmark setting, metadata for that benchmark setting (e.g., a severity level), and a computer-readable signature, similar to the signature for the list of CVEs described above, that allows a computing device to determine whether that benchmark setting is enabled or disabled. For example, the signature may have instructions to indicate in which configuration data element (e.g., configuration file, registry entry) to search for a configuration setting, and what that setting should be correctly set to (or not set to). If the setting is not correctly set, then the benchmark setting is not set (and as such may be in non-conformance or violation with the benchmark setting). An example of these benchmark settings is the Center for Internet Security (CIS) Benchmarks.

In one embodiment, the threat database 132 also includes a list of network attack signatures. These signatures describe network activity that may indicate a potential malicious activity on the network. The signatures may indicate some information about the network traffic, such as a source, a destination, packet type, packet header data, packet size, time of network activity, content of network data, and other information within the network data, that when detected, may indicate an attack. The signature may also indicate various patterns in the network activity, such as a pattern in the timing of data received/transmitted, a pattern in the network addresses that receive/send the data, a pattern in the types of systems or containers that send/receive the data, a pattern in the ownership of containers that are receiving/sending certain data, a pattern in the amount of data that is being sent/received, a pattern in the content of the data that is being sent/received and so on. Each signature may indicate multiple patterns and information about the network traffic. When the patterns and information for a signature are detected in the network traffic, then malicious activity may be indicated. For example, an amount of traffic that has a pattern exceeding a certain data rate, to a particular destination, may indicate an attack (e.g., a denial of service attack).

The container probe 122, network probe 124, and host probe 126 probe the containers, network, and host, respectively, in order to determine whether any of the threats in the threat database exist in the container system 102.

The container probe 122 probes the app containers 104 for any threats indicated in the threat database 132. As noted above, the threat database 132 may include a list of CVEs. The CVEs for app containers 104 may be present within the program libraries 110 of the app containers 104. The threat database 132 may also include a list of benchmark settings indicating correct settings for the app containers 104, such as access rights for the app container 104. The container probe 122 may check a section within the threat database 132 specifically for the app container 104, and check the signatures for vulnerabilities and benchmark settings listed in the threat database 132. If any of the signatures are matched to various sources within the app container 104, then the container probe 122 records the specific source from which the signature was detected. The container probe 122 may send these detections to the data logger 138, which records these into the data log 140. Alternatively, the container probe 122 may send the results of all signature matching operations, regardless of whether a successful match is found, such as for the benchmark settings. As an example, the container probe 122 may detect that an app container has root access using a signature for a benchmark setting in the threat database 132. The benchmark setting for this signature may indicate that an app container should not have root access, and therefore the detection of the root access by the container probe 122 indicates non-conformance with the benchmark setting. The container probe 122 may send to the data logger the benchmark setting for which the signature was matched, as well as where or how the signature was matched, e.g., within a settings file, or the results/log of running instructions of the signature of the benchmark setting.

The network probe 124 probes the network activity 108 of the app containers 104 as well as the overall network of the container system 102 for any threats indicated in the threat database 132. Although the network probe 124 is similar to the container probe 122, the network probe 124 checks network-related activities rather than container-related activities. The network probe 122 checks the signatures for vulnerabilities and benchmark settings listed in the threat database 132 to see if there are any matches to the signatures. The network probe 122 may check a section of the threat database 132 specific to network-related activities. If any matches are found, the vulnerability/benchmark setting that had a signature matched, as well as the location/log of that match is sent to the data logger 140 to be logged in the data logger 138. Alternatively, the results of all signature matching operations are sent to the data logger 138. As an example, the network probe 124 may determine that a particular program library 110 has a patch level 112 that indicates that the program library 110 includes a bug that may allow unauthorized access to the app container 104. The network probe 124 sends the patch level 112, program library 110 name, and CVE indicator for the bug to the data logger 138 to log in the data log 140.

In one embodiment, the network probe 124 may also scan for abnormal network behavior. The network probe 124 may take a baseline scan of network activity over time for each app container 104, for the host 150 of the app container 104, and/or for the network to which the app container 104 is connected. This baseline data is verified to represent normal behavior. This data may be fed by the network probe 124 into a model, such as regression model, a neural network, etc. Once the model is trained using the baseline data, live data of network activity is fed into the model. If the model determines that the live data deviates from the baseline beyond a certain threshold, then the network probe 124 determines that abnormal network activity may be occurring. This information is send to the data logger 138. The baseline data may be recorded per app container 104, such that the abnormal network activity may be determined per app container 104. In another embodiment, the network probe 124 determines that anomalous network behavior is occurring when it detects one or more specific behaviors in the network, such as TCP (Transmission Control Protocol) flooding, ICMP (Internet Control Message Protocol) flooding, invalid packets (e.g., packets with bad headers), ping death, SSL (Secure Sockets Layer) healthbleed, HTTP (Hypertext Transport Protocol) Slowloris DDoS (Distributed Denial of Service) attacks, and so on.

The network probe 124 may also scan the network traffic for the app containers 104, host 150, and other related networks for network traffic matching the signatures in the list of network attack signatures listed in the threat database 132. If a match is found, then the network probe 124 determines that abnormal network activity may be occurring. The match may be found if an exact match for the information and patterns indicated in the network attack signature is found, or if a percentage (e.g., 80%) of the information and patterns indicated in the network attack signature are matched in the network traffic. Once the network probe 124 finds the match, it may send a log and/or the contents of the network traffic that matches the signature to the data logger 138, and also transmit an indicator of the network attack signature that was matched.

The host probe 126 probes the host 150 and container service 160 for any threats indicated in the threat database 132. Similar to the container probe 122 and the network probe 124, the host probe 126 may match signatures in the threat database 132 with vulnerabilities and benchmark settings in the threat database 132 and send the identifier of the threat, and any logged information or threat location to the data logger 138. As an example, the host probe 126 may determine that the host 150 has configuration setting in the host configuration data 158 that allows non-root users to modify system critical files. This may cause a signature in the benchmark settings to be not matched. The benchmark setting in this case has a signature that matches when certain system critical files have only root level access. When the host probe 126 fails to find a match for this signature in these system critical files, then the host probe 126 transmits this information to the data logger 138.

The threat level policy store 130 indicates various policy settings for the app containers 104, host 150, and container service 160 that may impact a determination of the threat level assessment score by the threat level assessment engine 128. These policy settings are not vulnerabilities as they may not represent errors in the computer readable instructions of program libraries. These policy settings are not benchmark settings either, as they are not standardized settings that are can be applied to all systems universally. Instead, these policy settings may define specific conditions that are customized for a particular container system 102, and if they are detected in the container system 102, may either modify a threat level assessment score to increase or decrease that score. In particular, various policy settings in the threat level policy store 130 may indicate conditions that if detected are considered mitigating factors that lower the threat level assessment. Other policy settings may indicate conditions that if detected are exacerbating factors that increase the threat level assessment score. For example, conditions that might lower a threat level assessment score for an app container 104 may include various network security policies that are detected, such as network segmentation. As another example, a policy may indicate that a condition that may significantly increase a threat level assessment score for an app container 104 is if that app container has WAN access 106. These conditions may be specified using signatures, similar to those in the treat database 132. These conditions may be detected by the threat level assessment engine 128, which is described with more detail below.

In addition, the threat level policy store 130 may also instruct the threat level assessment engine 128 on weighting values, which indicate how to combine the log of various threats detected by the probes 122-126 to generate the threat level assessment score. For example, a detection of a CVE in the app container 104 may have a smaller weighting than a detection of a CVE in the host 150, when computing a threat level assessment score for the app container 104. Additional details regarding the generation of the threat level assessment score are described below with regards to the threat level assessment engine.

The threat level assessment engine 128 uses the threat level policy store 130 as well as the data logged in the data log 140 from the probes 122-126 to generate the threat level assessment score for an app container 104. The threat level assessment engine 128 retrieves the threats recorded in the data log 140 for the app container 104, network, and host 150. Using the threat level policy store 130, the threat level assessment engine 128 uses this retrieved threat information to generate the threat level assessment score.

For each app container 104, the threat level assessment engine 128, retrieves the threats listed in the data logger 138 for that app container 104, for network activity related to that app container 104, and for the host 150 and container service 160 upon which the app container 104 is executing. The network activity includes any indication of abnormal network behavior detected by the network probe 124.

The threat level assessment engine 128 also retrieves the policies from the threat level policy store 130. As noted, the threat level policy store 130 stores weighting values indicating how to combine the log of the various threats into a threat level assessment score. The threat level assessment engine 128 counts a number of threats detected by each probe 122-126. Each of these may be assigned an individual score using the weighting values in the threat level policy store 130. The score of a detected vulnerability may be proportional to its severity as indicated by the threat database 132 for that vulnerability, or may be proportional to a number of days for which the vulnerability has been known (i.e., published in a CVE database) and/or patched or a number of days since a verified in-the-wild attack has been created using the vulnerability. The score of a detected non-conformance with a benchmark setting may also be proportional to its severity level as indicated by the threat database 132.

In addition, the threat level policy store 130 may indicate how to combine the individual scores together. Scores for threats from the same sections (as indicated by the threat database 132) may be combined using a simple sum or other simple arithmetic (e.g., average) to generate a section score. These section scores may be further combined by the threat level assessment engine 128 using additional weight values from the threat level policy store 130. In one embodiment, the section scores for sections that are related to parts of the container system 102 that have a higher probability of being attacked by a malicious user are given a higher weighting. For example, threats related to the network may be given a higher weighting than threats related to the app container 104. As another example, threats related to the host 150 may be given a weighting in-between the weighting given to the network threats and the app container threats. The threat level assessment engine 128 generates the threat level assessment score by combining the section scores using the weighting values stored in the threat level policy store 130.

In one embodiment, the threat level assessment engine 128 additionally modifies the initial threat level assessment score (i.e., the score generated by combining the section scores) using the additional policies stored in the threat level policy store 130. As noted above, in one embodiment, the threat level policy store 130 may indicate a policy where detection of a condition of an app container 104 has access to the WAN (or Internet) causes the threat level assessment score to be increased. In another embodiment, the threat level policy store 130 may indicate a policy where the detection of anomalous network behavior (by the network probe 124) causes the threat level assessment score to be increased. In another embodiment, a type of process and/or application running within an app container 104 may be a detected condition of a policy which causes the threat level assessment score to be modified by the threat level assessment engine 128. For example, a type of process which creates a number of network sessions above a threshold number may be considered a networked process, which may cause the threat level assessment score for its container to be increased. In another embodiment, the threat level policy store 130 may include a policy that indicates that the threat level assessment score should be increased if extraneous files (e.g., those that are not recognized) are found by the threat level assessment engine 128 in the file system 156 of the host. The increase in score may be proportional to the number of extraneous files detected. Additional policies may be indicated to either reduce the threat level assessment score in the case where the condition indicated in the policy reduces the probability of undesired behavior in the app container 104 (e.g., an attack by a malicious user), or to increase the threat level assessment score where the condition indicated in the policy increases the probability of the undesired behavior.

In one embodiment, the threat level assessment score for an app container 104 may be generated according to a set of exemplary policies shown in Table 1 below.

TABLE 1

| Detected element | Contribution to score |
| --- | --- |
| WAN Access—Access to the Internet or a wide area network | +20 points |
| A High Priority/Severity CVE detected in the app container 104 | +1 point for each CVE detected, up to 20 points |
| A non-conformant CIS benchmark setting (i.e., a benchmark configuration warning) detected in the app container 104 | +1 point for each non-conformant setting, up to 10 points |
| Anomalous network behavior detected for the app container 104 | +20 points |
| A High Priority/Severity CVE detected for the host 150 (and/or container service 160) | +1 point for each CVE detected, up to 20 points |
| A non-conformant CIS benchmark setting (i.e., a benchmark configuration warning) detected in the host 150 (and/or container service 160) | +1 point for each non-conformant setting, up to 10 points |

The score generated above using the example policies generates a threat level assessment score that ranges from 0-100. However, in other embodiments, the threat level assessment score may be represented differently, such as with a larger range of scores, a list of categories (e.g., "high threat," "medium threat," and "low threat"), and so on. In addition, for the score contribution due to detected threats, although Table 1 shows that each detected (high severity) threat contributes one point to the score, in other embodiments, the contribution to the score for these threats is computed as a proportion to the total number of possible threats that may be detected. For example, if the threat database 132 lists a total of 100 vulnerabilities for the app container 104, then the detection of 20 vulnerabilities would cause the score contribution from the vulnerabilities to be 4, if the score range for vulnerabilities ranges from 0-20.

The threat level assessment engine 128 may send the threat level assessment score to the data logger 138 to be stored, and may also send the threat level assessment score to the report generator 134 to generate a report to be shown in the report interface 136. Additional information may also be sent along with the threat level assessment score, such as scores for individual sections, etc.

The automated response engine 142 responds to a high threat level assessment score generated by the threat level assessment engine 128 for an app container 104 by performing an action that may reduce a surface area of attack for the app container 104. The automated response engine 142 may receive a threat level assessment score that exceeds a threshold value (e.g., 80 or 80%) for an app container 104. The automated response engine 142 may perform one or more actions against the app container 104 in response, such as 1) suspending the app container 104 (e.g., by issuing a suspend command, such as "kill-STOP" in Linux, or requesting the container service 160 stop the app container 104), 2) freezing network access for the app container 104 (e.g., by blocking all network transmissions), 3) transmitting an alert (e.g., to a system admin), 4) filtering network data to/from the app container 104 to remove any suspicious data and/or sensitive information, 5) freezing the file system for the app container 104 (e.g., by refusing filesystem system calls from the app container 104), and so on. The automated response engine 142 may perform different actions based on how high the score is. For example, a score above 90% may cause the app container to be suspended completely, where as a score above 50% may only cause an alert to be generated. The automated response engine 142 may also respond differently depending on the sections for which the most threats were detected, and/or for certain types of conditions in policies which were met. For example, a high score indicating many network type threats, or policies which increase the score due to network-related activity (e.g., anomalous network behavior) may trigger a network related action, such as blocking network activity. The threat level policy store 130 may indicate the type of action to be performed by the automated response engine 142 according to the threat level assessment score, which threats were detected, and which policies were triggered. The automated response engine 142 may also send a report of the action that was taken along with any corresponding logs to the data logger 138 for logging in the data log 140.

The report generator 134 generates a report with a threat level assessment score, along with other metadata, for app containers 104 within the container system. This report may be presented in a graphical interface, such as the report interface 136. This report interface 136 may allow a user to filter, search, notate, drill down, and manipulate data related gathered in the data log 140 for a threat level assessment score. Additional details and examples of such a report interface 136 are described below with reference to FIGS. 2A-2C.

Although the above description was made in regards to a container environment, it may also apply to other environments, such as a native cloud and virtual environments. Furthermore, although the threat level assessment score described above relates to app containers 104, it may also apply to hosts 150 without probing within the app containers 104, and thus a score for hosts 150 can be generated as well.

With this threat level analyzer, a system administrator may be able to quickly determine which app containers 104 have high security risks. The system can automatically take action in response to these high risk app containers 104. Furthermore, the threat level analyzer container 120 may continuously probe and generate updated threat level assessment scores for app containers 104 in the container system 102. This allows for real time assessment of the behavior of app containers 104. The system also considers the security level of a host 150 when determining the threat level assessment score, as a secure app container 104 may not be secure if its underlying host 150 has many vulnerabilities.

Exemplary User Interfaces for Presenting Threat Level Assessments of Application Containers FIG. 2A is an exemplary user interface 200 presenting a list of containers and their associated threat level scores, along with a threat list for a container, as determined by the threat level analyzer, according to an example embodiment.

As described above, the report generator 134 may generate a report interface 136, and in one embodiment the report interface 136 may be the user interface 200 shown in FIG. 2A. User interface 200 displays a container list 202 indicating the names of app containers, such as app containers 104 in the container system, such as container system 102. The user interface 200 also displays the OS 204 indicating the operating system of the host (e.g., host 150) on which the app container is executing on, a network address 206 indicating a network address of the host, a container image 208 indicating a type of application image (e.g., database application, web server application, etc.), an analysis status 210 indicating the status of the probing and generation of the threat level assessment score for the app container, the threat level assessment score 212 for the container, and a threat severity count 214 indicating a count of "High" and "Medium" severity threats detected for that app container.

The user interface 200 also includes a legend 228 for the analysis status 210 of the generation of the threat level assessment score 212. This legend may indicate labels for "Scanned," "Failed," and "Scheduled," as well as a database version for the threat database, e.g., threat database 132.

For a selected app container in the container list 202, the user interface 200 also displays the detected threats list 216 for the app container. As shown, these threats are indicated by their CVE identifiers. The threat severity level 218 of each threat is listed, with a threat individual score 220 for each threat, threat package location 222 indicating a program library or source where the threat is found, a package version 220 indicating a patch level of that program library, and a package fixed version 226 indicating a patch level for that program library for which the threat no longer exists in the program library.

FIG. 2B is an exemplary user interface 230 presenting a list of hosts and a detail interface reporting individual threat and configuration tests, as determined by the threat level analyzer, according to an example embodiment. The user interface 230, which may be generated by the report generator 134 as part of the report interface 136, displays a list of hosts as the node list 232. Each entry in the node list 232 represents a host. For each host, the user interface 230 lists the OS 234, platform 238 (e.g., cloud provider), and various hardware information 240 (e.g., number of CPUs, amount of memory allocated). These hosts may be individual physical machines, or may be virtual machines.

For the selected host, the user interface 230 presents a threat report 242 that provides details of the threats that were detected in the host. In the particular example shown in the user interface 230, the threat report indicates the benchmark settings for which non-conformance was detected. For each entry in the threat report 242, a threat severity level 244 is indicated for that threat, and a threat description 246 is presented for that threat. The threat severity level 244 and threat description 246 may be retrieved (e.g., by the report generator 134) from the metadata in the threat database 132. The threat security level 244 may be indicated by a text indicator, such as "WARN," which may indicate a high severity level, and "INFO," which may indicate a low severity level. The severity level may be indicated in the benchmark setting itself in the threat database 132.

Figure 2C:
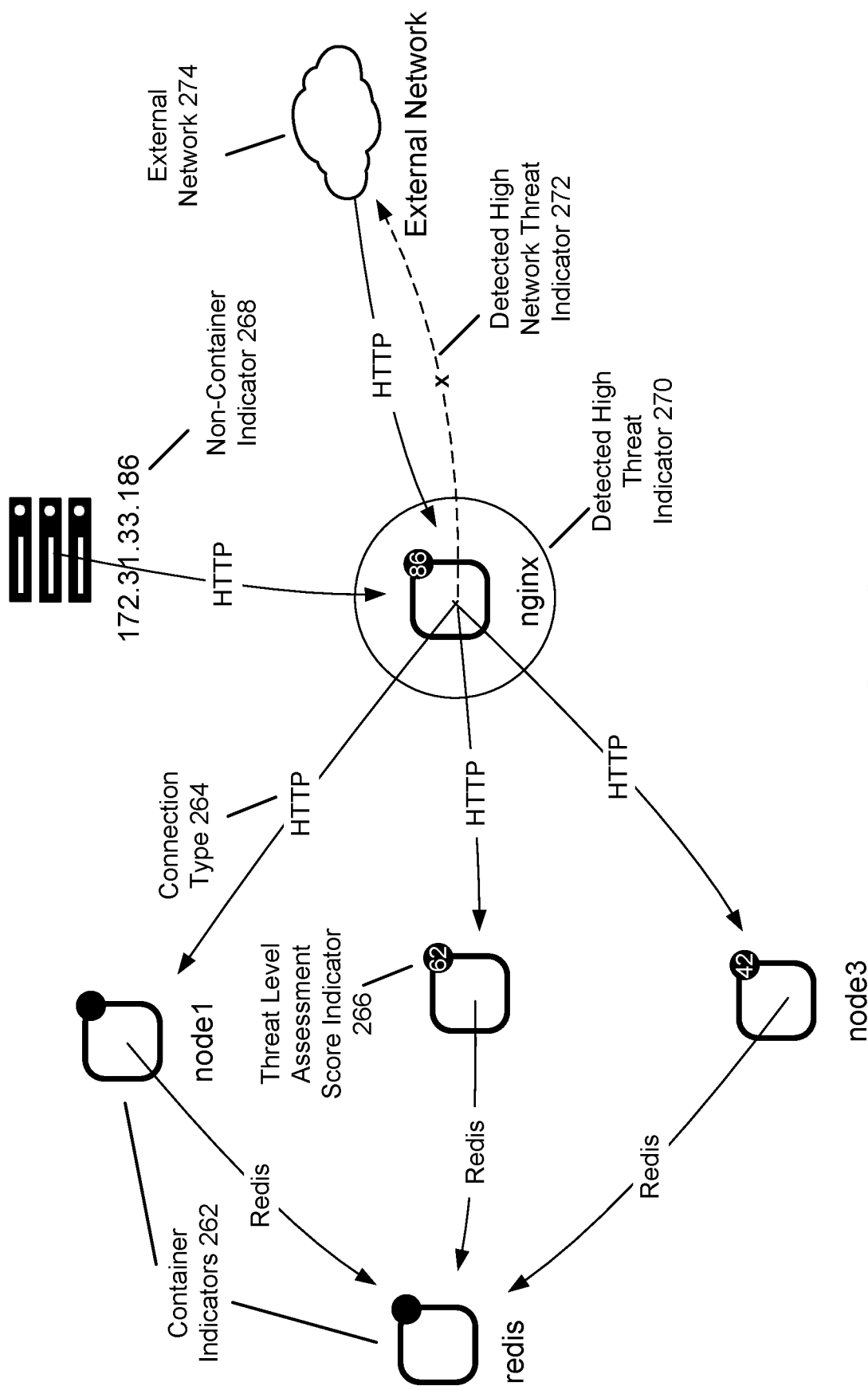
FIG. 2C is an exemplary user interface presenting a graph view of a plurality of containers, and interface elements indicating threat level scores and detected high level threats for certain containers, according to an example embodiment.

FIG. 2C is an exemplary user interface 260 presenting a graph view of a plurality of containers, and interface elements indicating threat level scores and detected high level threats for certain containers, according to an example embodiment.

The user interface 260 may be generated by the report generator 134 as part of the report interface 136. The user interface 260 represents each app container, e.g., app containers 104, with container indicators 262. These may be the vertices of the graph view. These container indicators 262 may be rounded square, with a label indicating the name of the container below the rounded square. A circular icon adjacent to the square (e.g., at the top right of the square) may indicate the threat level assessment score for that app container using the threat level assessment score indicator 266 for the corresponding app container. Arrow indicators may be presented and be placed in-between two container indicators 262, indicating a detected network connection between the app containers represented by the container indicators 262. These arrows may be the edges in the graph view. The direction of data transmission may be indicated using the direction of the arrow. These arrows may also be labeled with the protocol type 264 of the network connection. Additional devices on the network which are not containers may be represented using a non-container indicator 268 as shown.

If a threat level assessment score for an app container exceeds a threshold value, an additional detected high threat indicator 270 may be added to the container indicator 262 for that app container. This may be represented by a circle graphic surrounding the container indicator 262. The circle graphic may be in a high visibility color, such as red. The high threat indicator 270 may also indicate that some responsive action has been taken on the associated container, such as any of the actions which may be performed by the automated response engine 142. This may include quarantining the container or halting the container. In addition, if anomalous network behavior is detected by the network probe 124, a detected high network threat indicator 272 may be presented in the user interface 274 adjacent to the container indicator 262 of the app container for which the behavior was detected. The detected high network threat indicator 272 may be represented using a red arrow which extends from or terminates at the container indicator 262, and which is labeled with an "X." This detected high network threat indicator 272 may also indicate that the network connection has been blocked, due to the detection of the threat.

Example Container Architecture

FIG. 3 illustrates an example system 300 with an exemplary container architecture in which an threat level analyzer container, such as the threat level analyzer container 120 of FIG. 1, may operate, according to an embodiment. The system 300 includes the network 390, one or more client devices 370, one or more container servers, e.g., 310A, 310B (generally, 310) of a container system 305, with each container server 310 including one or more application ("app") containers, e.g., 320A, 320B (generally 320). A container server 310 also may include a security container 350, a management container 355, an analytics container 360, and/or a user interface (UI) container 365. Although the two illustrated container servers 310A and 310B include different containers, this is not meant to indicate that the container servers 310A and 310B are different. The containers within each container server 310 may be interchangeable, and thus each container server 310 is largely the same. Although the illustrated system 300 may include the elements shown in FIG. 3, in other embodiments the system 300 may include different elements. Furthermore, the functionalities of each element may be distributed differently among the elements in other embodiments. In the environment 300, the intercept container, such as intercept container 120, may reside in the security container 350. In one embodiment, the container system 305 is the container system 102 of FIG. 1.

The network 390, which can be wired, wireless, or a combination thereof, enables communications among the client devices 370 and the one or more container servers 310 of the container system 305 and may include the Internet, a local area network (LAN), virtual LAN (VLAN) (e.g., with VPN), wide area network (WAN), or other network. In one embodiment, the network 390 uses standard communications technologies and/or protocols, such as Hypertext transfer Protocol (HTTP), Transmission Control Protocol/Internet Protocol (TCP/IP), Uniform Resource Locators (URLs), and the Domain Name System (DNS). In another embodiment, the entities can use custom and/or dedicated data communications technologies instead of, or in addition to, the ones described above.

The client devices 370 are electronic devices used by users to perform functions such as consuming digital content, executing software applications, browsing websites hosted by web servers on the network 390, downloading files, and interacting with the container servers 310. For example, the client devices 370 may be dedicated e-readers, smartphones, wearables (e.g., smartwatches or pendants), or tablets, laptops, or desktop computers configured similar to an exemplary machine (or computing system) described with FIG. 6. A client device 370 may include one or more applications, such as a web browser, to interact with services provided by the container servers 310. Although two client devices 370 are illustrated in FIG. 3, in other embodiments the environment 300 includes more client devices 370.

The container servers 310 are electronic devices that communicate via network 390 and may execute hypervisors, virtual machines (VMs), and one or more containers. Each container server 310 may be located at a different physical location than another container server 310. However, the container servers 310 may communicate with each other via dedicated network links, such as a tunnel. This may allow services on each container server, such as the container services 330, to communicate with each other within a virtual local network. In one embodiment, the container servers 310 include an operating system that enables operating-system-level virtualization, such that the kernel of the operating system allows for multiple isolated user-space instances (i.e., "containers"). In one embodiment, the container servers 310 include an operating system that enables hardware virtualization, which is a method of simulating or emulating a separate set of hardware resources on which a guest operating system or other software to executes. In such a case, the container server 310 may include one or more hypervisors 340 for hardware virtualization, on which one or more virtual machines (VMs) 315 execute. In one embodiment, one or more container servers 310 may be represented by the host 150 of FIG. 1. In another embodiment, one or more VMs 315 may be represented by the host 150.

The hypervisor 340 is a software and/or hardware component executing on the container server 310 that creates and runs the VMs 315. The hypervisor 340 may execute directly on the hardware (e.g., processor, memory, storage, etc.) of the container server 310, may execute on an operating system of the container server 310, or may execute using a hybrid of these two (e.g., in the case of a Kernel-based Virtual Machine (KVM)). The ability to execute multiple VMs on a single hardware platform expands the capabilities of the hardware platform and simplifies management, while improving security. Furthermore, multiple different operating system versions and platforms may execute on each VM, while all using the same hardware platform.

The VMs 315 are emulations of a computer system or hardware platform. Each VM 315 emulates, either fully or partially, a set of hardware resources for a computer system. For example, the VM 315 may emulate a processor, memory, storage, graphics adapter, interrupts, and so on. Although the emulation may increase the resources needed to execute a task, and may lower efficiency, as noted, the VM 315 provides other benefits, such as the execution of multiple operating system versions and high availability, among other features.

Each VM 315 may execute an operating system that supports a container environment. As used here, container environment refers to the system upon which the containers are executing. In the illustrated example, the container environment is the VM 315 and operating system executing on the VM 315. However, in other cases, the container environment may be a physical system such as the container server 310 itself and the operating system executing on that container server 310.

As noted, an operating system may support a container environment by having a kernel that has enabled operating-system-level virtualization for multiple isolated containers, along with additional resource management features, which limit the resources allocated to each isolated container. For example, for each container executing within the operating system, a kernel may limit the amount of resources (e.g., memory, processor cycles) provided to that container through the use of various resource management components of the operating system (e.g., thread priority, memory allocation, etc.).

In one embodiment, the kernel may be a Linux kernel, and may support resource isolation features such as chroot, cgroups, kernel namespaces, and union-capable file systems (e.g., aufs) in order to isolate each container. These features restrict each container's view of the operating system's resources. Instead, each app container may only see a set of virtual resources, such as the virtual resources 150. For example, an app container 320 may only be able to view file systems that are authorized for that app container 320. In one embodiment, the kernel may be a FreeBSD kernel, and the operating-system-level virtualization functions may be implemented in a "jail" system call. Compared to virtual machines, operating-system-level virtualization does not incur an emulation overhead, do not require a separate disk image for each container, are more resource-efficient as dedicated resources do not need to be allocated per container, may be more efficiently threaded, and so on. However, the container may still execute within a VM. Although the container environment is described here as executing within a VM 315, in another embodiment the container environment executes directly on the hardware of the container server 310.

The virtual switch 335 may emulate a hardware switch in software, and may be similar to the virtual switch 152. Although the virtual switch 335 is shown to execute within the VMs 315, in other embodiments the virtual switch 335 executes within the hypervisor 340. In a packet-switched environment, a hardware switch receives packets with an indicated destination network address and routes these packets to an output port which is connected to a path on which the destination with the destination network address exists. The hardware switch also may support various management interfaces and protocols (e.g., quality of service (QoS). Similarly, the virtual switch 335 may provide functions that are similar to the above-described hardware switch, but instead of being implemented in hardware, the virtual switch 335 may be implemented in software (or in a hybrid software/hardware implementation). For example, the virtual switch 335 may route communications arriving at the container server 310 or VM 315 to the correct container or other service within the container server 310 or VM 315. As another example, the virtual switch 335 may route communications between containers of the same container server 310 or VM 315. The virtual switch 335 performs the routing using the network addresses of each container executing within the container server 310. While the virtual switch 335 is shown to be part of the VM 315 in the illustrated embodiment, in another embodiment the virtual switch 335 may be part of the hypervisor 340 or the VM 315 and the hypervisor 340 may each have a virtual switch.

The container service 330 is a collection of services to assist with the deployment and execution of containers on the VMs 315, and may be similar to the container service 160 of FIG. 1. Although two container services 330A and 330B are illustrated, they perform similar functions and are described together here. The container service 330 may include an application programming interface (API) for the use of software developers creating containerized software. The API may allow a software developer to easily create a containerized software application without having to implement operating system and operating system version specific functions, which are instead implemented by the container service 330. For example, the container service 330 may offer API function calls that may be used by a container to perform certain functions related to creating a container. The container service 330 may manage the isolation of resources for each container. These resources may include filesystem resources (e.g., system libraries), user and user groups, process trees (e.g., viewable processes), network resources, device resources, and inter-process communication resources (e.g., semaphores). The container service 330 may perform the isolation through the use of permissions restrictions, disk quotas, central processor unit (CPU) scheduling, input/output (I/O) scheduling, counters (e.g., beancounters), and so on.

The API of the container service 330 also may include functions to allow for a software developer to easily deploy containers on multiple hardware platforms in a distributed fashion, and for each container to be able to share data with other containers in a seamless fashion. For example, the container service 330 may allow one container to be able to access a same shared pool of data as another container through a standard API, without the need to manage the memory space directly.

The container service 330 also may be able to combine multiple container servers 310 or other hardware platforms into a single virtual host (e.g., a clustered host). The container service 330 also may include extensions to allow for easy integration with cloud services providers, such that a software developer may easily deploy a containerized application to one of these cloud services. Examples of container services include Docker®, Kubernetes®, and so on.

After receiving a request from an app container 320 (e.g., via the API), the container service 330 may also create a connection between the app container 320 and the virtual switch 335. This connection includes a port pair, with one port connected to the virtual switch 335, and the other pair connected to the app container 320. This connection also may include the network hardware layer address (e.g., media access control (MAC) address) and network address (e.g., Internet Protocol (IP) address) for the app container 320. This information provides the app container 320 with its own network address and isolated network path. The connection may be used by the app container 320 to route to other containers or destinations that are connected to network 390. The container service 330 also may provide the connection as a tunneled connection.

The app container 320 is a containerized software application executing in the container system 305, and may be similar to the app containers 104 of FIG. 1. In the illustrated embodiment of FIG. 3, the app container 320 is executing in the VM 315. However, in other embodiments, the app container 320 may execute directly on the container server 310 (via the operating system level virtualization of the container system 315) and not within a VM. Although two app containers 320A-B are shown here, in other embodiments each VM 315 (or container server 310) may have multiple app containers. The app container 320 may include any executable code as created by a software developer. The app container 320 may include a network interface to communicate with other entities in the network 390 via the virtual switch 335. As noted, each app container 320 may be isolated from other app containers 320. Each app container 320 may thus be in its own "domain." As noted, these domains may be created using different method of operating-system-level virtualization, such as through the use of namespaces (e.g., Linux namespaces).

In one example embodiment, the app container 320 may be stored as one or more images that include the executable code and other data for the containerized software application of the app container 320. Each image in the app container 320 may include updates and changes to the software application. These images may be part of a union file system, and may be joined together by the container service 330, along with a base image, in order to generate the complete application package. The running app container 320 comprises this complete application package. An additional read-write layer also may be added by the container service 330 to the running app container 320, as the images are read only.

The security container 350 may intercept communications from the app containers 320 for network security monitoring. As noted above, in a typical containerized environment, the container service 330 facilitates the connection of an app container 320 to the network 390. This connection may also be tunneled using an encryption protocol (e.g., secure sockets layer (SSL)). Due to this type of connection, intercepting the traffic of the app container 320 transparently is challenging. Furthermore, each container is self-contained, and as noted above, may be packaged as a read-only image. Thus, modifying the app container itself also may be undesirable.

Instead, the security container 350 monitors the VM 315 (or container server 310 if the container environment is the container server 310 itself) to determine if any new app containers 320 are created. To monitor the container environment, the security container 350 may communicate with the container service 330 or request for and/or be given special administrative rights that allow it to query or determine the processes executing on the VM 315. When the security container 350 determines that a new app container 320 is created and connected to the virtual switch 335, the security container 350 may intercept the network traffic of the new app container 320 by moving the connection between the virtual switch 335 and the new app container 320 such that the connection may be made between the virtual switch 335 and the security container 350 instead. The security container 350 also may create a new connection between the new app container 320 and the security container 350. The security container 350 may also save and recover any existing routing entries during this process.

After performing this intercept operation, network traffic to and from the new app container 320 flows through the security container 350. The security container 350 may be able to monitor this traffic and inspect it to determine if a network security issue exists. The security container 350 may perform various actions on the traffic, such as forwarding it, making a copy of it, and so on. Although a single security container 350 is illustrated, the container system 305 may include multiple security containers 350 clustered together.

Although the app containers 320 are illustrated as connecting to the security container 350 before connecting to the virtual switch 335, in other embodiments the app containers 320 connect directly to the container service 330, and the security container 350 intercepts traffic from the app containers 320 via the container service 330, which may forward traffic from the app containers 320 to the security containers 350.

The container system 305, in one embodiment, also includes an analytics container 360 to analyze information received from the security containers 350. In one embodiment, the security container 350 includes the functions of the threat level analyzer container 120 of FIG. 1. The analytics container 360 may request or receive longs and statistics from the security containers 350 regarding intercepted network traffic and other data. The analytics container 360 may analyze this information to produce various results. For example, the analytics container 360 may determine whether a denial of service attack is occurring within some of the application containers 320. The analytics container 360 may also forward the information and analytical results to the management container 355. The container system 305 may include multiple analytics containers 360 to allow for redundancy and high availability. In the case where the analytics container 360 includes the functions of the threat level analyzer container 120, the analytics container 360 may also generate reports indicating a threat level assessment score for app containers, and what type of threats were detected within each app container.

The container system 305, in one embodiment, also includes one or more management containers 355 for configuration and monitoring of the security containers 350 in the container system 305. The management container 355 may configure the settings and rules for the security containers 350 and the analytics container 360 in the container system 305. For example, these rules may indicate what type of network traffic to log or to filter out. The management container 355 monitors the activities of other management containers 355 and the security containers 350. Activities monitored may include start/stop activities, statistics, and so on. The management container 355 may also listen for reports and other information from the analytics container 360. Additionally, the management container 355 may receive instructions from the user interface (UI) container 365 regarding the configuration of rules in the security containers 350 and other options. Furthermore, the management container 355 may also present the reports and other information collected by the security containers 350 and analytics containers 360 to a user via the UI container 365. The container system 305 may include multiple management containers 355 to allow for redundancy and high availability.

The container system 305, in one embodiment, also includes a user interface (UI) container 365 to provide a user interface to a user. The UI container 365 may interface with a user using a graphical user interface (GUI) or a command line interface (CLI). As noted above, the UI container 365 communicates with the management container 355 and via the user interface the UI container 365 may indicate to the management container 355 the various configuration options requested by a user. The UI container 365 may also receive information, such as various analytical reports, statistics, and other data from the management container 355. If the interface is a GUI, the interface may be presented using various GUI elements, such as drop down menus, tables, and so on, and may be interfaced using interface devices such as a mouse and touchscreen. The UI container 365 may also present the data received from the management container 355 using various graphical presentation schemes, such as a scatterplot, table, graph, and so on. In one embodiment, the UI container 365 performs the functions of the report generator 134 of FIG. 1 to generate the report interface 136.

Example Flows

Figure 4:
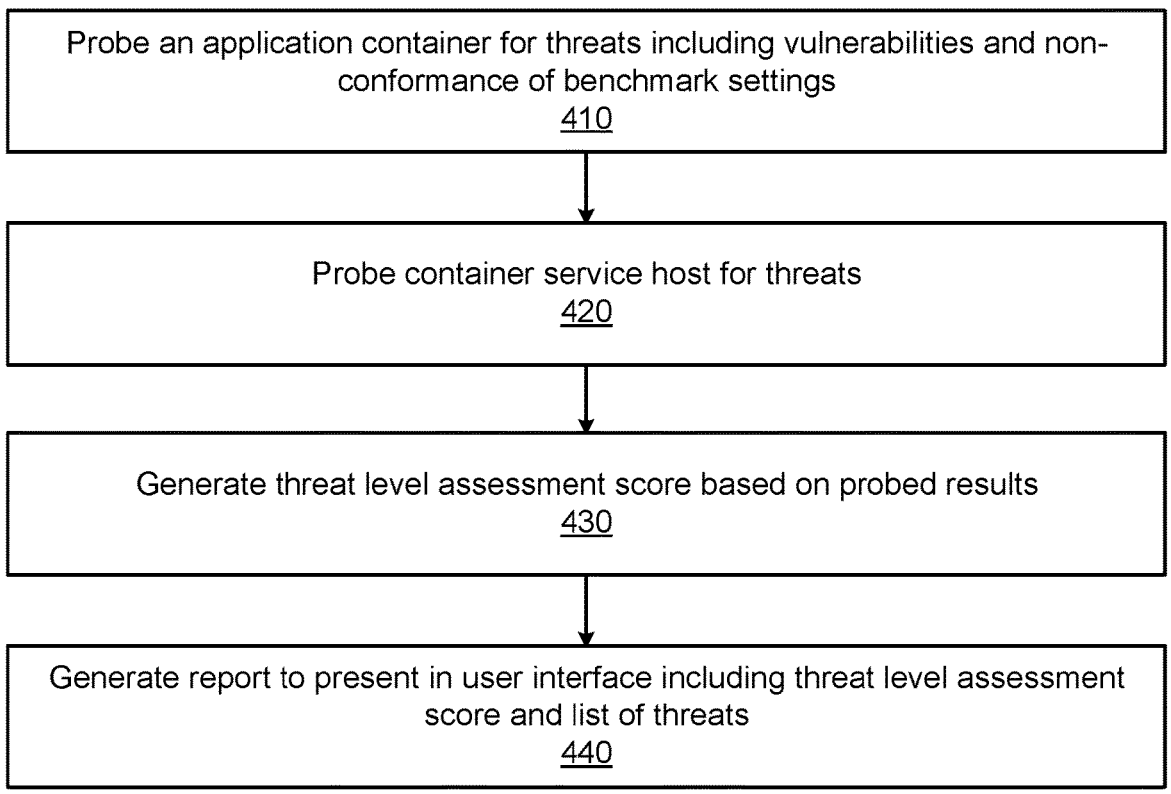
FIG. 4 is a flow chart illustrating an exemplary method for determining a threat level of a container and host in a container system, according to one embodiment.

FIG. 4 is a flow chart illustrating an exemplary method 400 for intercepting the traffic of an app container, according to one embodiment. In one embodiment, FIG. 4 attributes the steps of the method 400 to the threat level analyzer container 120. However, some or all of the steps may be performed by other elements (e.g., the analytics container 360). In addition, some embodiments may perform the steps in parallel, perform the steps in different orders, or perform different steps. Also, it is noted that in one example embodiment the steps and/or modules may be embodied as instructions, e.g., instructions 524, that may be executed by the processor 502 described with respect to FIG. 5.

The threat level analyzer container 120 probes 410 an app container, such as app container 104, in a container system (e.g., container system 102) for threats, including vulnerabilities and non-conformance to benchmark settings. These may include the threats in the threat database 132.

The threat level analyzer container 120 also probes 420 the container service host for threats as well. This may be performed by the host probe 126 of the threat level analyzer container 120.

The threat level analyzer container 120 generates a threat level assessment score based on the probed results. For example, this may be a score between zero and 100 as described above.

The threat level analyzer container 120 generates 440 a report to present in a user interface. This user interface may be the report interface 136 of FIG. 1, which is further illustrated in the exemplary interfaces of FIGS. 2A-2C. This report interface may include a threat level assessment score for the app container and a list of threats detected in the app container.

Example Machine Architecture

Figure 5:
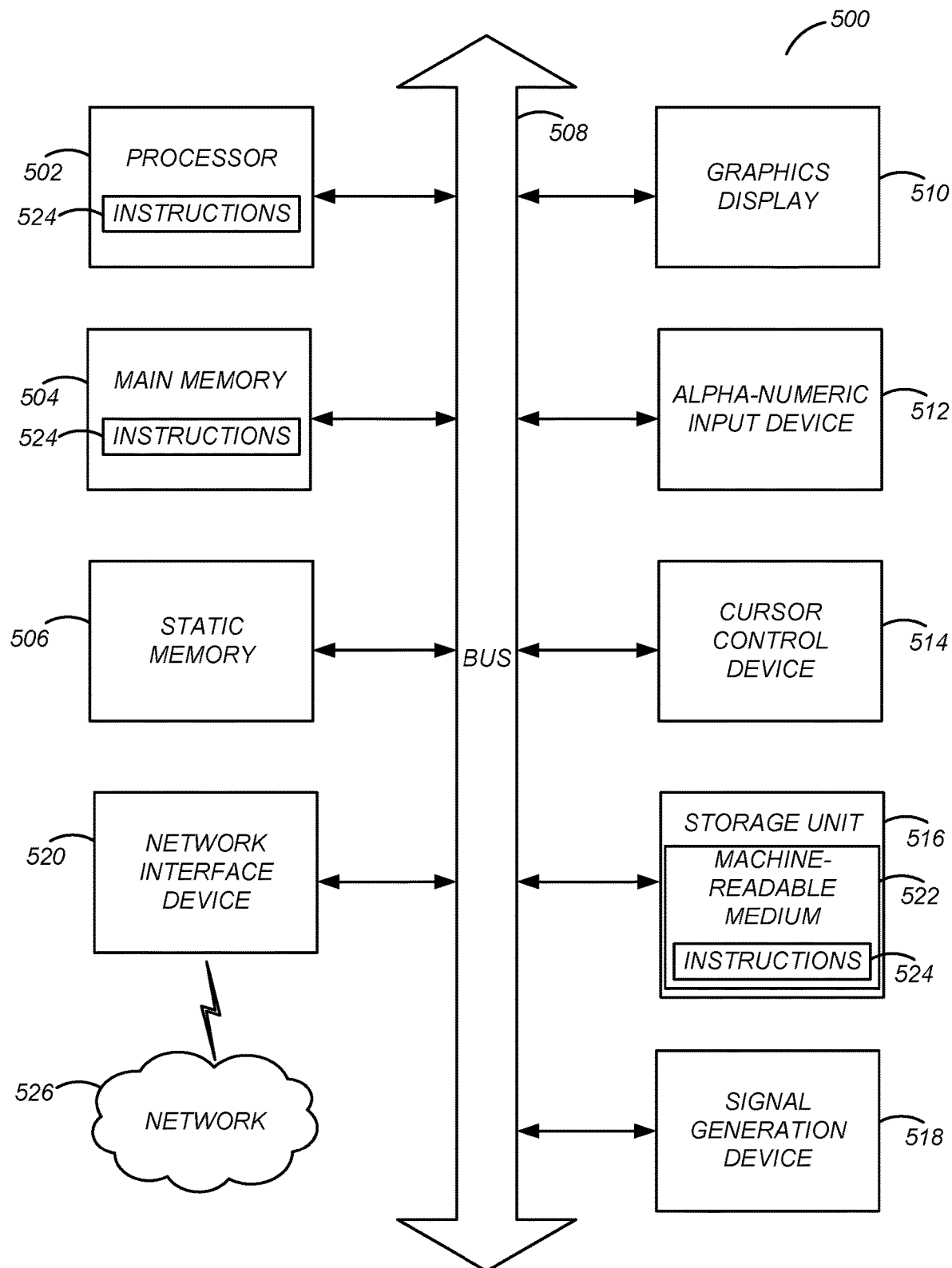
FIG. 5 is a block diagram illustrating components of an example machine able to read instructions from a machine-readable medium and execute them in a processor (or controller).

FIG. 5 is a block diagram illustrating components of an example machine able to read instructions from a machine-readable medium and execute them in a processor (or controller). Specifically, FIG. 5 shows a diagrammatic representation of a machine in the example form of a computer system 500. The computer system 500 can be used to execute instructions 524 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment. The computer system 500 is used to execute the processes and functionality described in FIGS. 1-4.

The machine may be a server computer, a client computer, a personal computer (PC), a tablet PC, a set-top box (STB), a smartphone, an internet of things (IoT) appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processing units (generally processor 502). The processor 502 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 500 also includes a main memory 504. The computer system may include a storage unit 516. The processor 502, memory 504 and the storage unit 516 communicate via a bus 508.

In addition, the computer system 506 can include a static memory 506, a display driver 510 (e.g., to drive a plasma display panel (PDP), a liquid crystal display (LCD), or a projector). The computer system 500 may also include alphanumeric input device 512 (e.g., a keyboard), a cursor control device 514 (e.g., a mouse, a trackball, a joystick, a motion sensor, or other pointing instrument), a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. The instructions 524 may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store the instructions 524. The term "machine-readable medium" shall also be taken to include any medium that is capable of storing instructions 524 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The system as disclosed provides benefits and advantages that include the ability to generate a threat level assessment score of app containers in a container environment that is dynamically updated and includes within the score an assessment of both the app container and its underlying host.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component.

Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1-4. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors, e.g., 502) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software (e.g., instructions 624) to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 502, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors 502 or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory 504). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for generation of threat scores in a container environment through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method in a container system, comprising:
    probing, by an threat level analyzer, for one or more threats within an application container in a container system, each threat being at least one of a vulnerability and a non-conformance with a benchmark setting, the application container including computer-readable instructions, and the application container initiated via a container service and isolated using operating system-level virtualization;
    probing for one or more threats within a host of the container service;
    generating a threat level assessment score based on results from the probing of the one or more threats of the application container and the one or more threats of the host;
    generating a report for presentation in a user interface including the threat level assessment score and a list of threats discovered from the probing of the one or more threats of the application container and the host; and
    transmitting the report to a client device of a user for presentation in the user interface, wherein the user interface is a graph view, wherein the application container is represented in the user interface by a container graphical indicator, wherein the threat level assessment score for the application container is indicated by a threat score graphical indicator adjacent to the container graphical indicator, and wherein connections between application containers are indicated by arrow connection indicators.

2. The method of claim 1, wherein generating a threat level assessment score further comprises:
    probing the application container to determine whether the application container generates requests to access a Wide Area Network (WAN); and
    increasing, in response to determining that the application container does generate requests to access the WAN, the threat level assessment score for the application container by a fixed value.

3. The method of claim 2, wherein generating a threat level assessment score further comprises:
    probing a network activity of the application container;
    determining whether the network activity of the application container indicates abnormal network behavior; and
    increasing, in response to determining that the application container does generate requests to access the WAN, the threat level assessment score for the application container by a fixed value.

4. The method of claim 1, wherein probing, for the one or more threats within the application container further comprises:
    retrieving entries from a threat database, each entry indicating a vulnerability using a Common Vulnerabilities and Exposures (CVE) identifier, and each entry indicating a signature used to identify the vulnerability;
    probing one or more software sources of the application container;
    determining whether one of the one or more software sources of the application container matches to the signature corresponding to the CVE identifier of one of the entries of the threat database; and
    wherein generating the threat level assessment score further comprises:
        increasing, in response to determining that one of the one or more software sources of the application container matches the signature corresponding to the one of the entries of the threat database, the threat level assessment score for the application container.

5. The method of claim 1, wherein probing, for the one or more threats within the application container further comprises:
    retrieving entries from a threat database, each entry indicating a benchmark setting using a Center for Internet Security (CIS) benchmark, and each entry indicating a signature used to identify a non-conformance with the benchmark setting;
    probing one or more software sources of the application container;
    determining whether one of the one or more software sources of the application container matches to the signature corresponding to the benchmark setting in one of the entries of the threat database; and
    wherein generating the threat level assessment score further comprises:
        increasing, in response to determining that one of the one or more software sources of the application container matches the signature corresponding to the benchmark setting in the one of the entries of the threat database, the threat level assessment score for the application container.

6. The method of claim 1, further comprising:
    determining whether the threat level assessment score for the application container exceeds a threshold value; and
    suspending, in response to determining that the threat level assessment score for the application container exceeds the threshold value, the application container from execution.

7. A container system comprising:
    one or more processors;
    memory storing one or more application containers, each application container including computer-readable instructions and initiated via a container service and isolated using operating system-level virtualization, the memory further storing code instructions, the code instructions, when executed by the one or more processors, cause the one or more processors to:
        probe for one or more threats within an application container in the container system, each threat being at least one of a vulnerability and a non-conformance with a benchmark setting, the application container including computer-readable instructions, and the application container initiated via a container service and isolated using operating system-level virtualization;
        probe for one or more threats within a host of the container service;
        generate a threat level assessment score based on results from the probing of the one or more threats of the application container and the one or more threats of the host;
        generate a report for presentation in a user interface including the threat level assessment score and a list of threats discovered from the probe of the one or more threats of the application container and the host; and
        transmit the report to a client device of a user for presentation in the user interface, wherein the user interface is a graph view, wherein the application container is represented in the user interface by a container graphical indicator, wherein the threat level assessment score for the application container is indicated by a threat score graphical indicator adjacent to the container graphical indicator, and wherein connections between application containers are indicated by arrow connection indicators.

8. The system of claim 7, wherein the threat level analyzer further operates to:
    probe the application container to determine whether the application container generates requests to access a Wide Area Network (WAN); and
    increase, in response to determining that the application container does generate requests to access the WAN, the threat level assessment score for the application container by a fixed value.

9. The system of claim 8, wherein the threat level analyzer further operates to:
    probe a network activity of the application container;
    determine whether the network activity of the application container indicates abnormal network behavior; and
    increase, in response to determining that the application container does generate requests to access the WAN, the threat level assessment score for the application container by a fixed value.

10. The system of claim 7, wherein the threat level analyzer further operates to:
    retrieve entries from a threat database, each entry indicating a vulnerability using a Common Vulnerabilities and Exposures (CVE) identifier, and each entry indicating a signature used to identify the vulnerability;
    probe one or more software sources of the application container;
    determine whether one of the one or more software sources of the application container matches to the signature corresponding to the CVE identifier of one of the entries of the threat database; and
    increase, in response to the determination that one of the one or more software sources of the application container matches the signature corresponding to the one of the entries of the threat database, the threat level assessment score for the application container.

11. The system of claim 7, wherein the threat level analyzer further operates to:
    retrieve entries from a threat database, each entry indicating a benchmark setting using a Center for Internet Security (CIS) benchmark, and each entry indicating a signature used to identify a non-conformance with the benchmark setting;
    probe one or more software sources of the application container;
    determine whether one of the one or more software sources of the application container matches to the signature corresponding to the benchmark setting in one of the entries of the threat database; and
    increase, in response to the determination that one of the one or more software sources of the application container matches the signature corresponding to the benchmark setting in the one of the entries of the threat database, the threat level assessment score for the application container.

12. The system of claim 7, wherein the threat level analyzer further operates to:
    determine whether the threat level assessment score for the application container exceeds a threshold value; and
    suspend, in response to determining that the threat level assessment score for the application container exceeds the threshold value, the application container from execution.

13. A non-transitory computer storage readable medium configured to store instructions, the instructions that when executed by a processor, cause the processor to:
    probe for one or more threats within an application container in a container system, each threat being at least one of a vulnerability and a non-conformance with a benchmark setting, the application container including computer-readable instructions, and the application container initiated via a container service and isolated using operating system-level virtualization;
    probe for one or more threats within a host of the container service;
    generate a threat level assessment score based on results from the probing of the one or more threats of the application container and the one or more threats of the host;
    generate a report for presentation in a user interface including the threat level assessment score and a list of threats discovered from the probe of the one or more threats of the application container and the host; and
    transmit the report to a client device of a user for presentation in the user interface, wherein the user interface is a graph view, wherein the application container is represented in the user interface by a container graphical indicator, wherein the threat level assessment score for the application container is indicated by a threat score graphical indicator adjacent to the container graphical indicator, and wherein connections between application containers are indicated by arrow connection indicators.

14. The non-transitory computer readable storage medium of claim 13, comprising further instructions that when executed by the processor cause the processor to:
   probe the application container to determine whether the application container generates requests to access a Wide Area Network (WAN); and
   increase, in response to determining that the application container does generate requests to access the WAN, the threat level assessment score for the application container by a fixed value.

15. The non-transitory computer readable storage medium of claim 14, comprising further instructions that when executed by the processor cause the processor to:
   probe a network activity of the application container;
   determine whether the network activity of the application container indicates abnormal network behavior; and
   increase, in response to determining that the application container does generate requests to access the WAN, the threat level assessment score for the application container by a fixed value.

16. The non-transitory computer readable storage medium of claim 13, comprising further instructions that when executed by the processor cause the processor to:
   retrieve entries from a threat database, each entry indicating a vulnerability using a Common Vulnerabilities and Exposures (CVE) identifier, and each entry indicating a signature used to identify the vulnerability;
   probe one or more software sources of the application container;
   determine whether one of the one or more software sources of the application container matches to the signature corresponding to the CVE identifier of one of the entries of the threat database; and
   increase, in response to the determination that one of the one or more software sources of the application container matches the signature corresponding to the one of the entries of the threat database, the threat level assessment score for the application container.

17. The non-transitory computer readable storage medium of claim 13, comprising further instructions that when executed by the processor cause the processor to:
   retrieve entries from a threat database, each entry indicating a benchmark setting using a Center for Internet Security (CIS) benchmark, and each entry indicating a signature used to identify a non-conformance with the benchmark setting;
   probe one or more software sources of the application container;
   determine whether one of the one or more software sources of the application container matches to the signature corresponding to the benchmark setting in one of the entries of the threat database; and
   increase, in response to the determination that one of the one or more software sources of the application container matches the signature corresponding to the benchmark setting in the one of the entries of the threat database, the threat level assessment score for the application container.

18. The non-transitory computer readable storage medium of claim 13, comprising further instructions that when executed by the processor cause the processor to:
   determine whether the threat level assessment score for the application container exceeds a threshold value; and
   suspend, in response to determining that the threat level assessment score for the application container exceeds the threshold value, the application container from execution.

* * * * *